Oct. 6, 1964                 C. A. JOHNSON                 3,151,534
                      VASCULAR RECORDING APPARATUS
Original Filed Sept. 4, 1959                              2 Sheets-Sheet 1
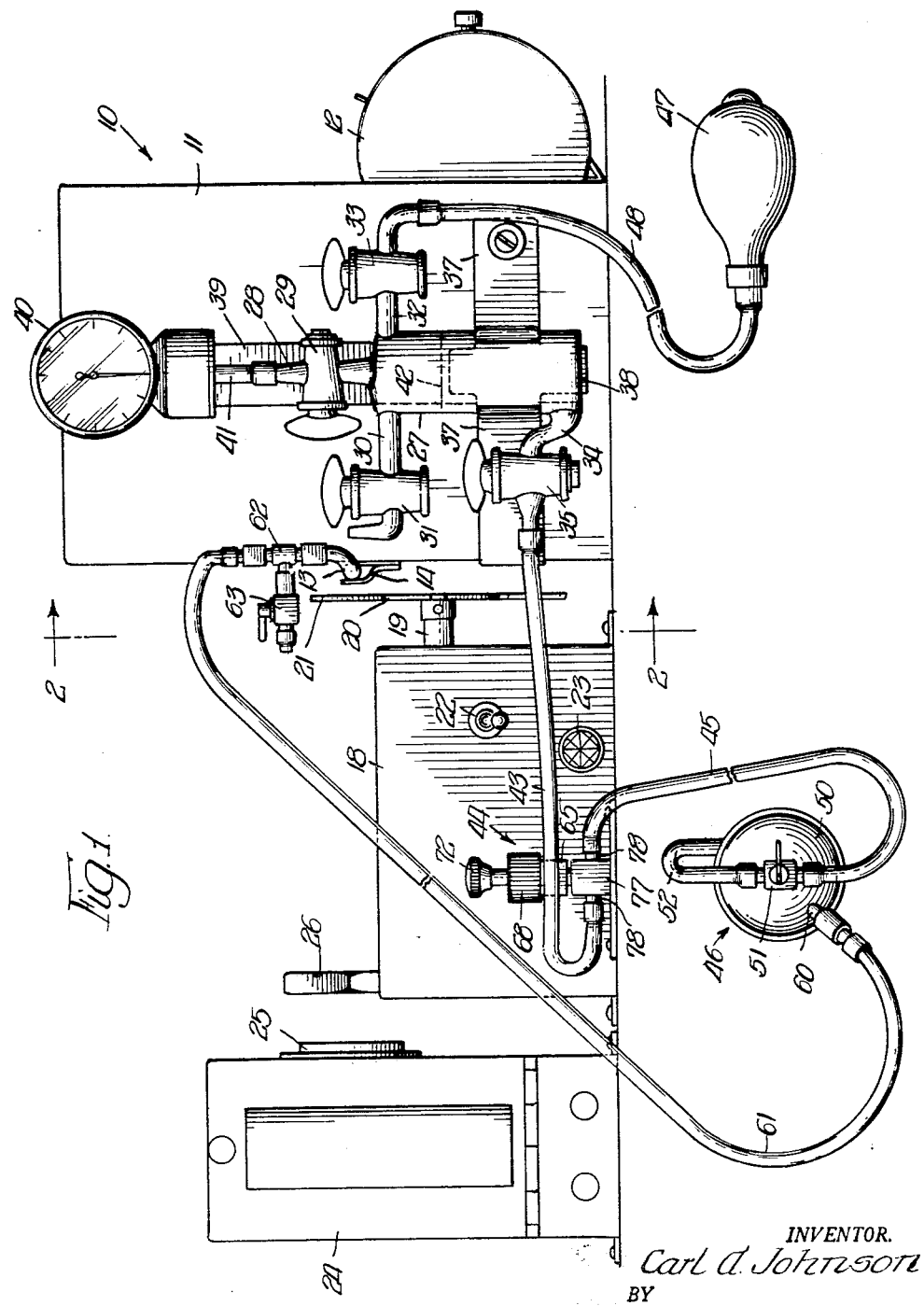
INVENTOR.
Carl A. Johnson
BY
Cromwell, Greist & Warden
ATTYS

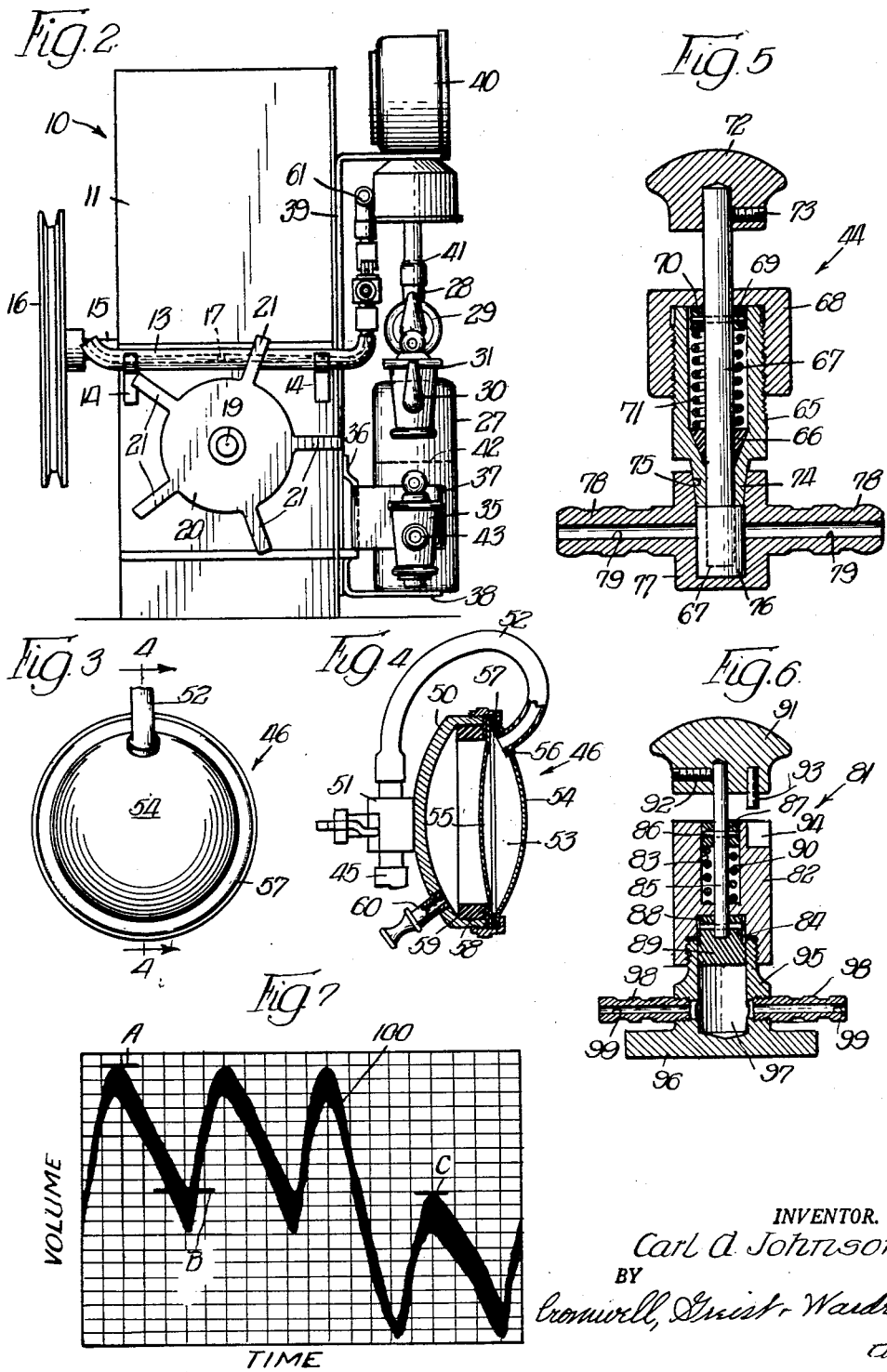

United States Patent Office 3,151,534
Patented Oct. 6, 1964

3,151,534
VASCULAR RECORDING APPARATUS
Carl A. Johnson, Chicago, Ill., assignor to Aares
Institute, Chicago, Ill., a corporation of Illinois
Original application Sept. 4, 1959, Ser. No. 838,150, now
Patent No. 3,083,705, dated Apr. 2, 1963. Divided
and this application Sept. 13, 1962, Ser. No. 223,559
1 Claim. (Cl. 92—50)

The present invention is directed to improvements in vascular recording aparatus for use in measuring arterial volume pulse and other related factors. More specifically, the invention deals with pulse responsive, volume variation transmission means for recording purposes, the means being of a nature permitting wider measurement application in connection with volume pulse and related determinations. This application is a division of my copending application Serial No. 838,150, filed September 4, 1959, now Patent No. 3,083,705, issued April 2, 1963.

In my earlier Patent No. 2,634,611, I disclose a vascular recording apparatus including an attachment for application to a graphic recording instrument of the oscillometer type for the purpose of extending the utility of such instrument in the observance and recording of arterial blood vessel changes which are identified with the heart beat. An oscillometer is an instrument for measuring oscillations of any kind, especially the changes in the volume of pulsations in the arteries. Such instruments have been developed for various purposes, including application on the heart, spleen, kidneys and digits. The digital oscillometer is employed in recording rapid vascular changes such as are manifested by the fingers or toes and in ordinary use includes a small, glass pressure vessel applied in pressure sealing relation to a toe or finger with the variations in the volume within the vessel induced by pulse-created changes in cross-sectional areas of the digit being transmitted from the vessel through a flexible tube to a small, horizontally disposed, open-ended transparent tube. This tube is provided with a small bore in which a droplet of 95% alcohol is placed, the exterior of the tube being appropriately graduated. By disposing the tube before a photographic paper (which may be special graphic paper) and projecting a beam of light onto the tube, the droplet is utilized to reproduce on the paper a calibrated pulsating wave representing the pulse-induced volume changes in the blood vessels of the digit. A record of this type is of considerable value in the diagnosis of circulatory conditions or other conditions influencing the blood flow in the vascular system.

My patented attachment adapts the digital-type oscillometer operating principles to utilization in the study of vascular conditions in the extremities, namely, the arms and legs. This extended use of the oscillometer has been found to be of material importance. The adaptation of the oscillometer to the measurement of much more violent or pronounced variations in blood vessel volume as experienced in the extremities provides for precisely controlled recordings of vascular conditions for clinical studies which was not possible prior to my invention.

Interest in the subject of arterial circulation is intensified at the present time due to the growing incidence of arterial disease associated with increased longevity as well as the new developments in surgical and non-surgical methods in the treatment of arterial disease. Material advancements can be made in such studies as well as in the field of diagnosis where objective methods may be utilized which do not require arterial puncture. Accordingly, broadening the utility of an oscillometer-type recording apparatus in its use in clinical studies as well as the field of diagnosis is of material importance. The sensitivity of the oscillometer-type apparatus is comparable to the electrocardiograph in that it is capable of providing a permanent recording of events in arterial circulation which occur at intervals on the order of 0.04 second or less.

It is an object of the present invention to provide new and improved vascular recording apparatus adapted for application to areas which have heretofore been inaccessible for comparable objective study and diagnosis.

A further object is to provide a new and improved oscillometer-type vascular recording apparatus having as a part thereof a new and improved pulse transmission means which utilizes pressurized hydraulic fluid conduction in transmitting pulse-induced volume variations for recordation.

An additional object is to provide a new and improved pulse transmission means for use in an oscillometer-type vascular recording apparatus, the pulse transmission means including a pressurized closed hydraulic system in conjunction with a separate pulse-induced volume conductive fluid system, the arrangement providing for pulse transmission means application to confined areas which have heretofore been inaccessible for vascular condition study.

Still a further object taken in conjunction with the foregoing objects is to provide new and improved apparatus for vascular recording purposes, the apparatus including volume displacement means for controllably displacing a movable volume variation responsive means with the controlled displacement thereof being subject to recording for improved arterial volume pulse determinations, the invention including the utilization of such volume displacement means broadly in the apparatus as a part thereof and, further, being directed to specific forms of such means.

Still another object of the present invention is to provide a new and improved pulse area application means for use in vascular recording apparatus such as an oscillometer of the type to be described.

Other objects not specifically set forth will become apparent from the following detailed description of the invention, made in conjunction with the accompanying drawings wherein:

FIG. 1 is an elevation of a known type of vascular recording apparatus including as a part thereof the new and improved pulse transmission means of the present invention;

FIG. 2 is a sectional view of the recording portion of the apparatus of FIG. 1 taken generally along line 2—2 therein;

FIG. 3 is a face elevation of the new and improved pulse area application means of the present invention;

FIG. 4 is a vertical section of the pulse area application means of FIG. 3 taken generally along line 4—4 therein;

FIG. 5 is a vertical section of one form of volume displacement means adapted for use in the pulse transmission means of the present invention;

FIG. 6 is a vertical section of an other form of volume displacement means adapted for use in the pulse transmission means of the present invention; and FIG. 7 is a diagrammatic reproduction of a portion of a typical photographic record produced as a result of operation of the apparatus of FIG. 1.

The vascular recording apparatus including the new and improved pulse transmission means to be described is particularly adapted for use in the study of the arterial volume pulse in the brain, intraorbital tissues, temporal artery and forehead. Measurement of the arterial volume pulse from the brain is effective in determining the presence of a defective cranium which allows for alternations in the amount of blood to enter the cranial cavity with each heart beat. It also provides a knowledge of the changes in the circulatory system of the brain which occur between infancy and adulthood to lead to an improved understanding of the developmental defects of the eyes and central nervous system. The intraorbital tissues of the human being have only one arterial blood supply which is from the ophthalmic division of the internal carotid artery. In this respect, the human eye is considered to be an ideal site for recordings for a reflection of the cerebral circulation. Because of the delicate structure of the eye, the condition of the eye often suggests organic and functional diseases of the body. Furthermore, impaired arterial circulation to the intraorbital tissues might be classed as a peripheral vascular disease in much the same manner as is impaired circulation of the legs. The apparatus of the present invention provides for recordation of the vascular condition of the various portions of the body as described and thus materially increases the utilization of the precise measuring and recording functions of a basic oscillometer.

The basic vascular recording apparatus as particularly illustrated in FIG. 1 includes a recording oscillometer 10 of known type including a light tight casing 11 in which photographic paper (not shown) is suitably advanced from a supply magazine (not shown) mounted within the casing 11 to a collecting magazine 12 detachably mounted to the casing 11. The photographic paper is suitably fed through the casing 11 for exposure through a transverse slot (not shown) in the face of the casing 11 on which a transparent glass tube 13 is mounted by brackets 14. As shown in FIG. 2, the casing 11 has extending therefrom a shaft 15 which is driven through a pulley 16 by suitable means such as an electric motor engaged with the pulley 16 through a belt or the like. The shaft 15 provides for advancing of the photographic paper through the casing 11 for recording purposes.

The tube 13 is provided with an internal bore of very small diameter, with this bore opening through the left-hand end of the tube as viewed in FIG. 2. A droplet 17 of the 95% alcohol is received in the bore and positioned approximately midway of the length of the tube in alignment with the exposure slot in the adjacent face of the casing 11.

To the left of the casing 11 as shown in FIG. 1 is a motor housing 18 having a suitable electric motor mounted therein, the drive shaft 19 of which projects from the front face of the housing 18 and has fixedly mounted thereon a rotating timing device 20 which includes a plurality of circumferentially spaced, radially outwardly projecting vanes 21 (see FIG. 2). The housing 18 further carries a suitable motor operating switch 22 with an operating light 23 as operational indication means.

To the left of the motor housing 18 as shown in FIG. 1 is a light source housing 24 having a suitable light source therein with light therefrom being directed from the housing 24 through a condensing lens system 25 toward the casing 11. The condensing lens system 25 concentrates and directs light on the transparent tube 13 to cast the refractive image of the droplet 17 on the photographic paper exposed thereto in the casing 11. An interchangeable filter system 26 to increase or decrease the amount of light as required is carried by the motor housing 18. During recording, the rotary timing device 20 rotates to interrupt the beam of light at equal intervals of predetermined frequency to produce on the advancing photographic film in the casing 11 a series of time-interval marks or ordinates to facilitate the interpretation of the record of blood vessel change reproduced on the paper. The arrangement described and the operation thereof are entirely conventional and are set forth in greater detail in my aforementioned patent.

The present invention includes the new and improved pulse transmission means used with the oscillometer apparatus described. As particularly shown in FIGS. 1 and 2, the pulse transmission means includes a liquid reservoir in the form of a transparent chamber 27 having integrally formed therewith a vertically upwardly directed transparent tube 28 which has mounted therein a known type of stopcock 29. The upper portion of the chamber 27 has also integrally formed therewith an air exhaust tube 30 having mounted therein a stopcock 31. Directed oppositely from the tube 30 is another integrally formed air supply tube 32 also having a stopcock 33 mounted therein. The bottom portion of the chamber 27 has integrally formed therewith a transparent tube 34 having a stopcock 35 mounted therein. The chamber 27 is mounted to one side face of the casing 11 by a bracket mount 36 of any suitable type such as including flexible spring arms 37 which clamp the chamber 27 in upright position on a bottom support member 38. Rearwardly of the chamber 27 is a gauge mounting strip 39 extending upwardly along the side of the casing 11 and attached at the top thereof to an air pressure gauge 40 which is in communication with the tube 28 by attachment thereto through flexible tubing 41.

As shown in FIG. 1, the chamber 27 forms a part of a hydraulic fluid system which includes the use of water or other suitable non-compressible liquid, a supply of which is maintained in the bottom portion of the chamber 27 at a level as indicated by the reference numeral 42. The hydraulic fluid system further includes a transparent flexible tube section 43 connected to the tube 34 outwardly of the stopcock 35 and further connected to a volume displacement means generally designated by the numeral 44. A further section of transparent flexible tubing 45 is connected to a pulse area application means forming a part of the present invention and generally designated by the numeral 46. An inflating bulb 47 of known type is connected through a flexible tube 48 to the tube 32 to deliver air into the chamber 27 above the water level therein to place the water in the hydraulic system under a predetermined pressure. The stopcock 33 is maintained open during the delivery of air from the bulb 47 and the stopcock 31 is closed to hold the air in the chamber 27. The stopcock 29 is open for air pressure measuring purposes and the gauge 40 indicates the pressure of air applied to the hydraulic system. The stopcock 35 is open for transmission of pressurized liquid throughout the remaining portion of the hydraulic system and into the pulse application means 46. The stopcock 31 is used to release air from the chamber 27 and gauge 40. The remaining stopcocks are supplied for use as desired.

The pulse area application means 46 as shown in FIGS. 3 and 4 is formed from a cup-shaped housing 50 which has mounted on the rear face thereof a valve mechanism 51 to which the flexible tubing 45 is attached. A transparent flexible tube 52 is also attached to the valve mechanism 51 and its opposite end is in communication with the interior of a diaphragm-type chamber 53. The chamber 53 is defined by two overlying flexible diaphragms 54 and 55 with the outer diaphragm 54 having a tube fitting 56 secured therein to place the tube 52 in communication with the chamber 53. The peripheries of the diaphragm 54 and 55 are suitably held in an annular clamping ring 57 which is threadedly received on the housing 50. A diaphragm support washer 58 is clamped inwardly of the diaphragm 55 by the clamping ring 57 and holds in place a relatively thick gasket-type element 59 which is received in the housing 50 and which backs up the diaphragm 55 to protect the same.

The housing 50 has fixed thereto an air system fitting 60 which is designed for attachment to one end of a transparent flexible tube 61 as shown in FIG. 1. The tube 61 extends to a valve fitting 62 having a valve element 63 connected thereto while also being suitably connected to the tube 13 as particularly shown in FIG. 2. The valve 63 provides for the maintaining of air in the tube 61 and the housing 50 of the pulse area application means 46. The housing 50 rearwardly of the diaphragm 55 thus defines an air chamber which is in communication with the droplet 17 in the tube 13 through the tube 61 and valve fitting 62, all of these elements providing a separate fluid system which is in volume variation transmitting relation wtih the hydraulic fluid system through direct association with the diaphragm chamber 53 in the pulse area application means 46.

In the operation of the pulse transmission means as described, the water supplied to the diaphragm chamber 53 from the reservoir chamber 27 is placed under pressure by air pumped into the chamber 27. The diaphragms 54 and 55 are thus expanded and upon application of the diaphragm 54 to a pulse area, a pulse-inducted volume variation occurs in the pressurized water within the chamber 53. This volume variation is transmitted through the inner diaphragm 55 to the air system described and transmitted by the air system to the droplet 17 in the tube 13. Consequently, the droplet 17 will move within the bore of the tube 13 in response to volume differential as established on one side by the pulse-induced air volume variation and on the other side by atmospheric air pressure through the open end of the tube 13. The droplet will pulsate longitudinally and this pulsation will be suitably recorded on the advancing photographic paper as previously described.

The pulse area application means 46 is, in effect, a double chamber device with the inner air chamber defined between the housing 50 and the inner diaphragm 55 being in isolated, co-extensive common surface communication with the hydraulic fluid chamber 53. The chambers are dimensioned to provide for adequate response to a wide range of pulse-induced volume for efficient recording purposes. As the pulse area application means 46 may be applied to many different locations, the double chambers are dimensioned to accommodate such wide variations in pulse-induced volumes without excessive movement of the droplet 17 in the tube 13. The shape of the pulse area application means 46 is such that the same may be readily applied to several different locations for volume pulse measurements. In this respect, the pulse area application means may be held against any part of the head including the temple and forehead. The pulse area application means is particularly adapted for placement directly over the eye for vascular condition recording purposes. To facilitate such placement, the outer diaphragm 54 is preferably expanded by pressurized hydraulic fluid to bulge materially outwardly of the face of the pulse area application means 46.

FIG. 5 illustrates in detail the essential features of the volume displacement means 44 previously described in connection with FIG. 1. This means is a plunger-type device designed to increase the effective volume of the hydraulic fluid system by displacement of a predetermined quantity of liquid therein. The displacement means includes a cylindrical plunger housing 65 seating therein a frusto-conical packing 66 through which is received a reciprocal plunger or piston rod 67. The upper end of the housing 65 has threadedly received thereon a closure cap or bonnet 68. The rod 67 has a transverse pin 69 fixed therein and extending therethrough to hold in place an annular packing or washer 70 which limits the extent to which the rod is moved vertically upwardly in the housing 65 by abutment with the inner surface of the cap 68. A coil spring 71 is seated between the packings 66 and 70 and is placed in compression to hold the rod in upwardly projecting relation and retracted within the housing 65. The upper projecting end of the rod 67 has received thereon a knob 72 fixed thereto by a set screw 73 and arranged for rod depression limiting function by engagement with the top outer surface of the cap 68 upon depression of the rod 67. The lower end of the housing 65 is defined by a tapered frusto-conical projection 74 receiving the lower end of the rod 67 therethrough and frictionally seated in a complementary tapered seat 75 forming the upper end of a fluid displacement chamber 76 which forms a part of a mounting fixture 77. The mounting fixture 77 is provided with oppositely directed tube receiving nipples 78 which are serrated on the outer surfaces thereof for receiving thereabout the ends of the tube sections 43 and 45 of FIG. 1. Hydraulic fluid flow passages 79 communicate with the chamber 76 through the nipples 78.

Depression of the rod 67 results in movement of the lower end thereof into the chamber 76 as indicated in broken lines in FIG. 5. The lower end of the rod is so dimensioned in combination with the dimensions of the chamber 76 that a predetermined volumetric displacement results. This displacement increases the volume in the hydraulic fluid system and this increase in volume is transmitted to the diaphragm chamber 53 of the pulse area application means 46 resulting in expansion of the diaphragms 54 and 55. The degree to which the diaphragm 55 is expanded further results in compression of the air trapped in the separate system which includes the droplet 17 in the tube 13 and the droplet is moved longitudinally in the tube 13 to a specific extent. As will be described in greater detail, this displacement or controlled movement of the droplet 17 in the tube 13 provides a means for direct measurement of blood volume as recorded on the photographic paper in the oscillometer 10.

Another form of volume displacement means 81 is illustrated in FIG. 6. This means may be substituted for the volume displacement means 44 in the fluid system of FIG. 1. The means of FIG. 6 includes a housing 82 which is sub-divided into an upper chamber 83 and a lower chamber 84. A piston rod 85 extends axially through the chamber 83 and through a suitable bore in the dividing wall and into the chamber 84. The rod 85 has transversely received therethrough a fixed pin 86 mounting thereabout an annular packing or washer 87 which frictionally slides in the chamber 83. The lower end of the rod 85 has another transverse pin 88 received therethrough in the chamber 84, this pin fixing to the lower end of the rod a "Teflon" piston 89. A coil spring 90 is seated between the packing 87 and the dividing wall between the chambers 83 and 84 and is in compression to hold the rod 85 and piston 89 retracted in the positions shown in FIG. 6.

The upper projecting end of the rod 85 has fixedly received thereon a knob 91 housing a set screw 92 in engagement with the rod. The knob 91 carries a downwardly projecting depression limiting pin 93 which upon depression of the knob 91 enters into a groove 94 in the housing 82 and eventually abuts the bottom surface of the groove 94 to limit the extent of depression and the extent of downward movement of the piston 89 out of the chamber 84. The lower end of the housing 82 is threadedly mounted on a sleeve 95 which forms a part of a mounting fixture 96 and defines centrally thereof a volume displacement chamber 97. Tube connecting nipples 98 are threadedly received in the fixture 96 placing their internal passages 99 in communication with the chamber 97. Depression of the knob 91 results in the piston 89 moving down into the chamber 97 and displacing therefrom a predetermined quantity of liquid. The piston 89 is preferably formed from "Teflon" as described in view of the self-lubricating properties of this material as well as the general chemical inertness thereof. With this material it is unnecessary to provide lubrication to the volume displacement means 81. This volume displacing device replaces the one described in the previous patent and has superior qualities of convenience, portability, accuracy, and ease of operation.

FIG. 7 illustrates a typical reading taken with the apparatus of the present invention, the reading, by way of example, resulting from application of the means 46 against a patient's eye. As previously described, pulse-induced volume changes occur in the pressurized fluid chamber 53 of the pulse area application means 46 with these volume changes being transmitted through the diaphragm 55 to the air system, through the tube 61 forming a part thereof and against the droplet 17 in the tube 13. The location of the droplet 17 in the tube 13 may be controlled by a suitable venting of the air system by means of the valve element 63. In this respect, air can also be introduced into the air system through the valve element 63 to maintain a predetermined volume therein, thus setting the location of the droplet 17 for efficient response to any type of pulse reading, whether weak or strong. The tube 13 in the casing 11 can be calibrated to provide the scale indicated in FIG. 7 wherein the horizontal lines denote volume and the vertical lines denote time interval. The rotary timing device 20 may be operated at any desired synchronized speed as, for example, to provide 0.04 second intervals on the photographic paper. Further by way of example, the volume lines may be set up at intervals of 0.01 ml. whereas the vertical time lines may be spaced from one another to denote differences of 0.04 second.

The graph of FIG. 7 includes a sharply defined black image 100 representing the droplet 17 of alcohol. Pulse-induced variations in the location of the droplet are evident on the developed photographic paper as shown in FIG. 7 and each peak A denotes the magnitude of a pulse beat. Accordingly, the magnitude of the pulse in its relation with arterial pulse volume is measurable between the upper and lower extents of each pulsation as designated between A and B. From the graph obtained, information is available as to the heart rate, the crest time, the time of the diastolic slope, the amplitude of the arterial volume pulse in horizontal lines, and the amplitude of a specified volume change in horizontal lines. As to the latter information, the volume displacement means 44 or 81 is used to displace the droplet 17 relative to the photographic paper as illustrated in FIG. 7. Depression of the plunger or piston rod of the displacement means results in displacement of the apex or crest of the curve on the photographic paper to a point C as compared to the original point A. With this controlled and known volume displacement, which for the eye is preferably 0.1 ml., by simple ratio the arterial blood volume can be determined directly from the graph. The number of lines between the points A and B denotes the amplitude of the arterial volume wave. The extent to which the wave is displaced upon operation of the displacement means 44 or 81 is measured by counting the lines between the point A and the point C. The first reading is to the unknown volume of blood moved during one pulse as the second reading is to the volume displaced in the hydraulic fluid system by operation of the displacement means 44 or 81. This simple ratio is then solved for the volume of blood moved during one pulse.

It will be appreciated that the controlled volume displacement as afforded by the means 44 or 81 will vary with the location of vascular study. As previously described, a 0.1 ml. volume displacement is used for the eye and a 1.0 ml. volume displacement is used for the arm or leg. The use of transparent tubing, particularly in the hydraulic fluid system, is preferable from the standpoint of observing the system to determine if air is trapped therein. In this respect and for efficient operation, it is necessary to maintain all air out of the liquid portion of the hydraulic system with the air being supplied to pressurize the same at a point remote from the pulse area application means 46. The tapered mounting of the housing 65 of the volume displacement means 44 in the fixture 77 permits ready withdrawal of the housing 65 to remove any air trapped in the hydraulic portion of the system.

Obviously certain modifications and variations of the invention as hereinbefore set forth may be made without departing from the spirit and scope thereof, and therefore only such limitations should be imposed as are indicated in the appended claim.

I claim:

A pulse area application means for use in vascular recording apparatus, said means comprising a double chamber capsule having a first chamber formed between superimposed and peripherally sealed flexible and expandable diaphragms, liquid delivery means in communication with the interior of said first chamber, one of said diaphragms being exposed and expanded outwardly of a face portion of said capsule for pulse area application, a second chamber in isolated co-extensive common surface communication with the other of said diaphragms, and air passageway means in communication with said second chamber for pulse-induced volume variation transmission therefrom.

No references cited.